United States Patent [19]

Soodalter

[11] Patent Number: 4,712,272
[45] Date of Patent: Dec. 15, 1987

[54] PORTIONING, SHAPING AND DISPENSING APPARATUS

[76] Inventor: Arnold Soodalter, University Park Apts.-Apt. M-1, Easthampton Rd., Holyoke, Mass. 01040

[21] Appl. No.: 942,440

[22] Filed: Dec. 16, 1986

[51] Int. Cl.$^4$ ............................................. A22C 7/00
[52] U.S. Cl. ....................................... 17/32; 425/360; 426/513
[58] Field of Search ........................... 17/32; 425/360; 426/513

[56] References Cited

U.S. PATENT DOCUMENTS

| 2,181,737 | 11/1939 | North | 17/32 |
| 2,666,229 | 1/1954 | Vogt | 17/32 X |
| 3,096,540 | 7/1963 | Miller et al. | 17/32 |

Primary Examiner—Willie G. Abercrombie
Attorney, Agent, or Firm—Ross, Ross & Flavin

[57] ABSTRACT

Apparatus for portioning, shaping and dispensing a plurality of molded, spherically shaped meatballs includes a food product entry area communicating with a compression chamber for compression and movement of the food product into a positioning area wherein it is given a rod-like shape and moved to a shaping area wherein it is given a spherical shape and dispensed into a suitable receiving means.

2 Claims, 21 Drawing Figures

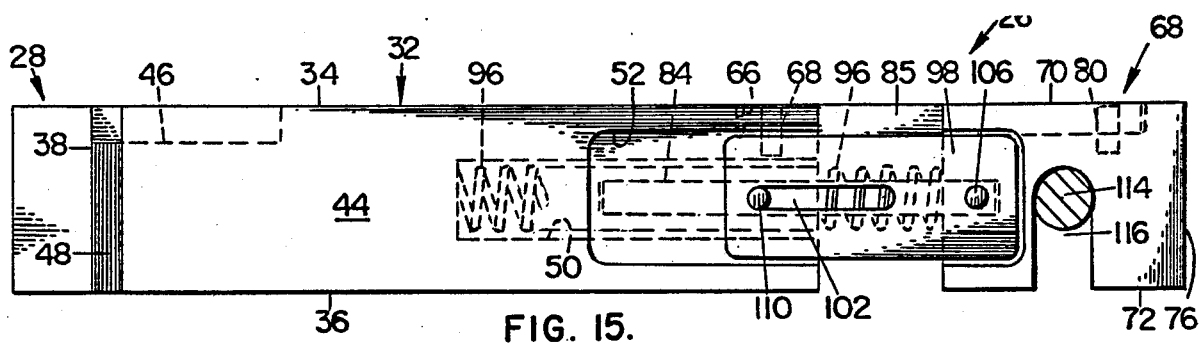
FIG. 15.
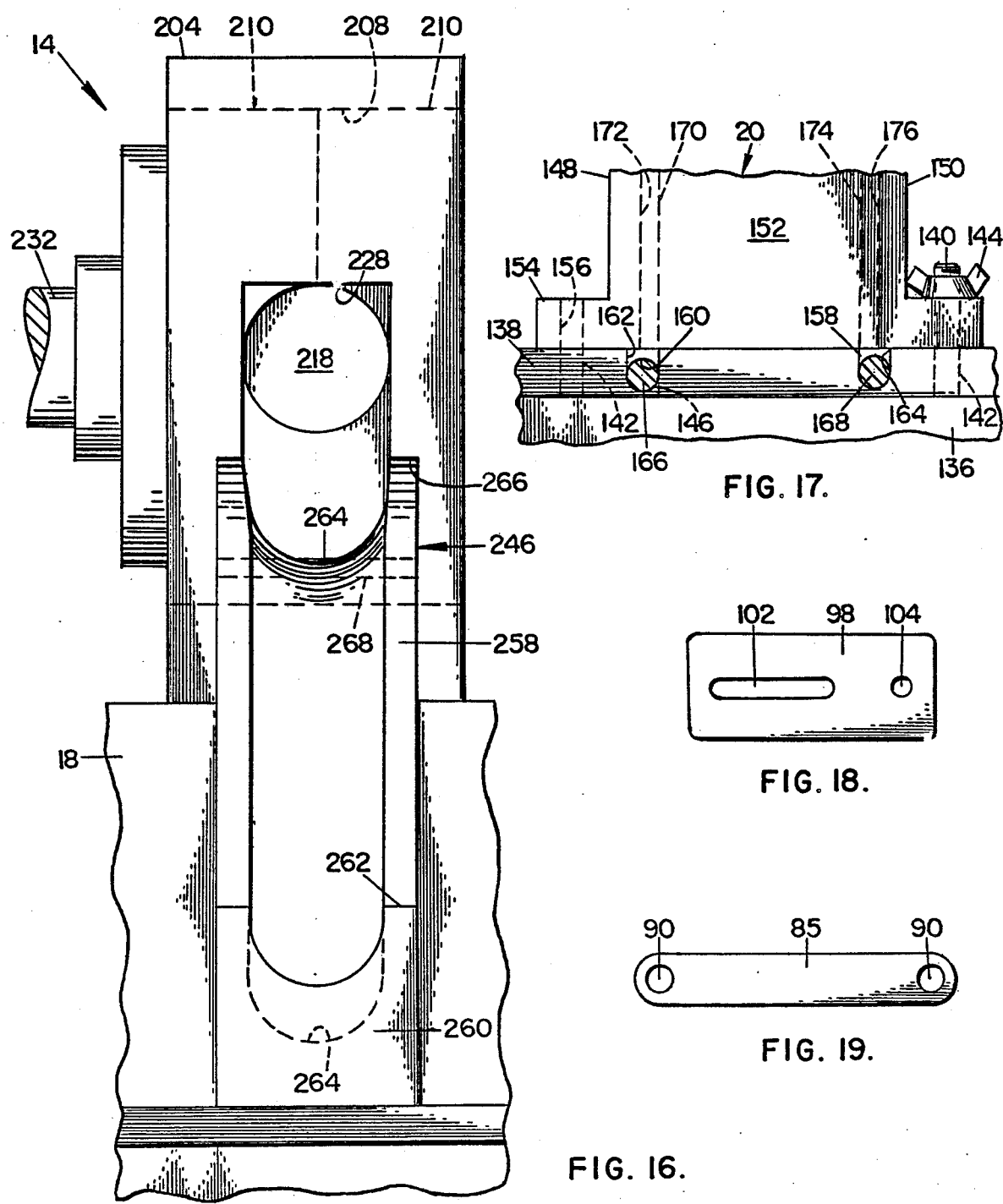
FIG. 17.
FIG. 18.
FIG. 19.
FIG. 16.

PORTIONING, SHAPING AND DISPENSING APPARATUS

BACKGROUND OF THE INVENTION

1. Field of the Invention

The invention pertains to the portioning, shaping and dispensing of moldable materials such as meatballs and other food products.

2. Description of the Prior Art

Various types of meatball forming machines have been provided. However, for the most part, these machines have been complicated, expensive and difficult to maintain and clean.

SUMMARY OF THE INVENTION

The apparatus of the invention provides a reliable, inexpensive, simple machine for portioning, shaping and dispensing food products, the machine being easily maintained and cleaned.

BRIEF DESCRIPTION OF THE DRAWINGS

FIG. 15 is a front elevational view thereof;

FIG. 16 is an enlarged, end elevational view of the portioning and shaping means as seen from the left of FIG. 1, with the shaping wheel removed for clarity;

FIG. 17 is an enlarged, fragmentary front elevational view of the product supply hopper;

FIG. 18 is a front elevational view of one of the side links of the compression means;

FIG. 19 is a top plan view of the top link of the compression means;

DESCRIPTION OF THE PREFERRED EMBODIMENT

The apparatus comprises a compression area generally indicated by 10, a product entry area generally indicated by 12, a portioning area generally indicated by 14, and a shaping and dispensing area generally indicated by 16.

Figure 1:
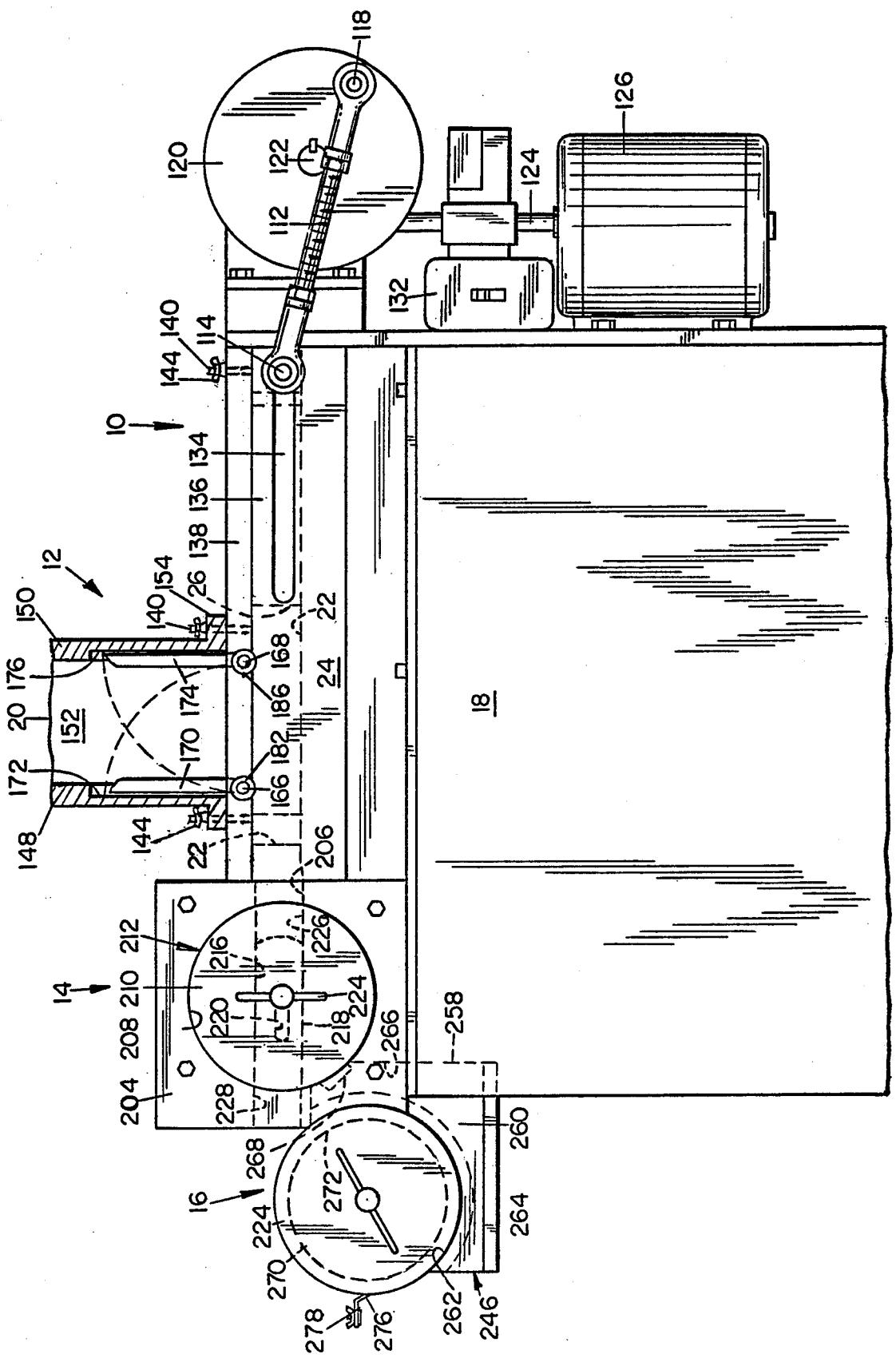
FIG. 1 is a front elevational view of portioning, shaping and dispensing apparatus embodying the invention with portions broken away for clarity.

Each of areas 10, 12, 14 and 16 is positioned in series in axial alignment upon a supporting table or base 18, with compression area 10 being disposed at the far right, and shaping and dispensing area 16 being arranged at the far left as viewed in FIG. 1, and with the product entry and portioning areas 12 and 14 disposed therebetween.

Product entry area 12 includes a product supply hopper 20 positioned above and in communication with a compression chamber 22 of a slide housing 24 supported upwardly of table or base 18.

Compression means, generally indicated by 26, is slidably disposed in compression chamber 22 of slide housing 24 for moving food product from product entry area 12 to portioning area 14.

Compression means 26, best seen in FIGS. 5-15, includes a trio of side-by-side pushers or compactors, namely a central pusher or compactor 28 flanked on each side by outside pushers or compactors 30 and 32.

Outside pushers or compactors 30 and 32 are of like construction, except that one is right hand and the other is left hand. Each is of elongate generally rectangular construction having spaced, parallel, horizontally-disposed upper and lower walls 34 and 36 respectively, spaced, parallel, vertically-disposed forward and rearward walls 38 and 40, respectively, and spaced parallel, vertically-disposed inner and outer side walls 42 and 44 respectively. Each outside compactor is provided with a shallow, generally rectangular relief or recess 46 which extends downwardly into the compactor body from upper wall 34 adjacent forward wall 38, for purposes to appear.

Forward wall 38 is cut away as at 48 to provide a relief adjacent outer side wall 44, also for purposes to appear.

A horizontally-disposed annular recess 50 extends inwardly from rearward wall 40 a short distance along the central longitudinal axes of outside compactors 30 and 32.

A horizontally-disposed rectangular recess 52 is provided in outer wall 44 of each outside compactor and extends inwardly from rearward wall 40 for a short distance.

Central compactor 28 is of elongate, generally rectangular construction having spaced, parallel upper and lower walls 54 and 56 respectively, spaced, parallel, vertically disposed forward and rearward walls 58 and 60 respectively, and spaced, parallel, vertically disposed side walls 62.

A horizontally disposed annular recess 64 extends inwardly from rearward wall 60 a short distance along the central axis of compactor 28.

Compactor 28 is provided with a shallow, substantially rectangular recess 66 which extends downwardly into the compactor body from upper wall 54 and inwardly into the compactor body from rearward wall 60.

The compactors 28, 30 and 32 are linked to and carried by a rectangular compactor carrier generally indicated by 68 having spaced, parallel, horizontally-disposed upper and lower walls 70 and 72, respectively, spaced, parallel, vertically extending forward and rearward walls 74 and 76, respectively, and spaced, parallel vertically-extending side walls 78.

A trio of equi-spaced, annular openings 80 is provided on the central horizontal axis of compactor carrier forward wall 74, each opening extending horizontally inwardly and rearwardly a short distance into the carrier body.

Each opening 80 is axially-aligned with one of the openings 50 and 64 in the outer compactors 30 and 32 and the central compactor 28, respectively, and has one end of a pin 82 tightly fitted therein.

Each pin 82 extends horizontally outwardly from forward wall 74 of carrier 68 and has an outer forward end 84 receivable in the adjacent one of the openings 50 and 64 in the compactors 28, 30 and 32.

The outer end 84 of the centrally located pin 82 of the trio of pins is tightly sleeved in opening 64 of central compactor 28.

A top link 85 connects between compactor carrier 68 and central compactor 28, the link being disposed upwardly of and in spaced parallelism to pin 82.

One end of top link 85 is positioned in a recess 86 provided in upper wall 70 of compactor carrier 68 and its opposite end is positioned in recess 66 in the upper wall 54 of central compactor 28.

A pair of pins 88 extend downwardly through spaced openings 90 adjacent the opposite ends of top link 85 and into spaced aligned openings 92 and 94 provided in the top walls of compactor carrier 68 and central compactor 28 respectively, to rigidly connect the central compactor to the compactor carrier.

The outside compactors 30 and 32 are mounted for slideable horizontal movement toward and away from compactor carrier 68.

The outer ends 84 of the two outside pins 82 of the trio of pins extending outwardly from compactor carrier 68 are loosely receivable in the openings 50 in the outside compactors 30 and 32, and have compression springs 96 sleeved thereon.

One end of each compression spring 96 bears against forward wall 74 of compactor carrier 68 and the opposite end of each compressor spring 96 bears against the inner forward wall of each opening 50 in outside compactors 30 and 32 to effectively spring load each of the compactors, for purposes to appear.

A pair of side links 98 connects between compactor carrier 68 and each of the outside compactors 30 and 32.

One end of each link 98 is disposed in a recess 100 provided in each side wall 78 of compactor carrier 68 and the other end of each link 98 is disposed in the recesses 52 provided in the outer side walls 44 of outside compactors 30 and 32, each one of the recesses 52 being axially aligned with one of the recesses 100 in the compactor carrier.

Each link 98 has a through slot 102 and a through opening 104 spaced therefrom on the link central longitudinal axis.(See FIG. 18).

A pin 106 extends through opening 104 in link 98 and into a provided opening 108 in the adjacent side wall 78 of compactor carrier 68, the pin being tightly fitted in the openings 104 and 108.

A pin 110 has an outer free end disposed in the slot 102 of each link 98, each pin 110 extending outwardly from each recess 52 in outside compactor side walls 44 and having an inner end fixed in an opening 111 in said side wall.

Pins 110 ride in the slots 102 of links 98 as the outside compactors are moved toward and away from compactor housing 68, with links 98 sliding within the recesses 52 in the compactor side walls.

Linear reciprocation of compression means 26, which includes the compactors 28, 30 and 32 and compactor carrier 68, is effected through a pair of spaced crank arms 112 each pivotally connected at one end to the opposite ends of a shaft 114 which passes transversely through compactor carrier 68, the shaft being disposed in a transverse slot 116 which extends vertically upwardly into the carrier body from carrier lower wall 72.

Crank arms 112 are pivoted at their opposite ends at 118 to a pair of spaced drive discs 120 keyed to a common shaft 122 operatively connected to a drive shaft 124 of a motor 126.

Shaft 114 rides in spaced, aligned, horizontally-disposed slots 134 provided in the side walls 136 of compression chamber 22, the slots lifting the range of linear movement of compression means 26.

Compression chamber 22 is closed by a top plate 138 which rests on the upper surfaces of the chamber side walls 136.

Spaced, parallel, threaded studs 140 extend upwardly from chamber side walls 136 and are receivable in aligned vertical through openings in top plate 138, the studs having wing nuts 142 threaded thereon for releasably securing the top plate to the compression chamber.

Figure 3:
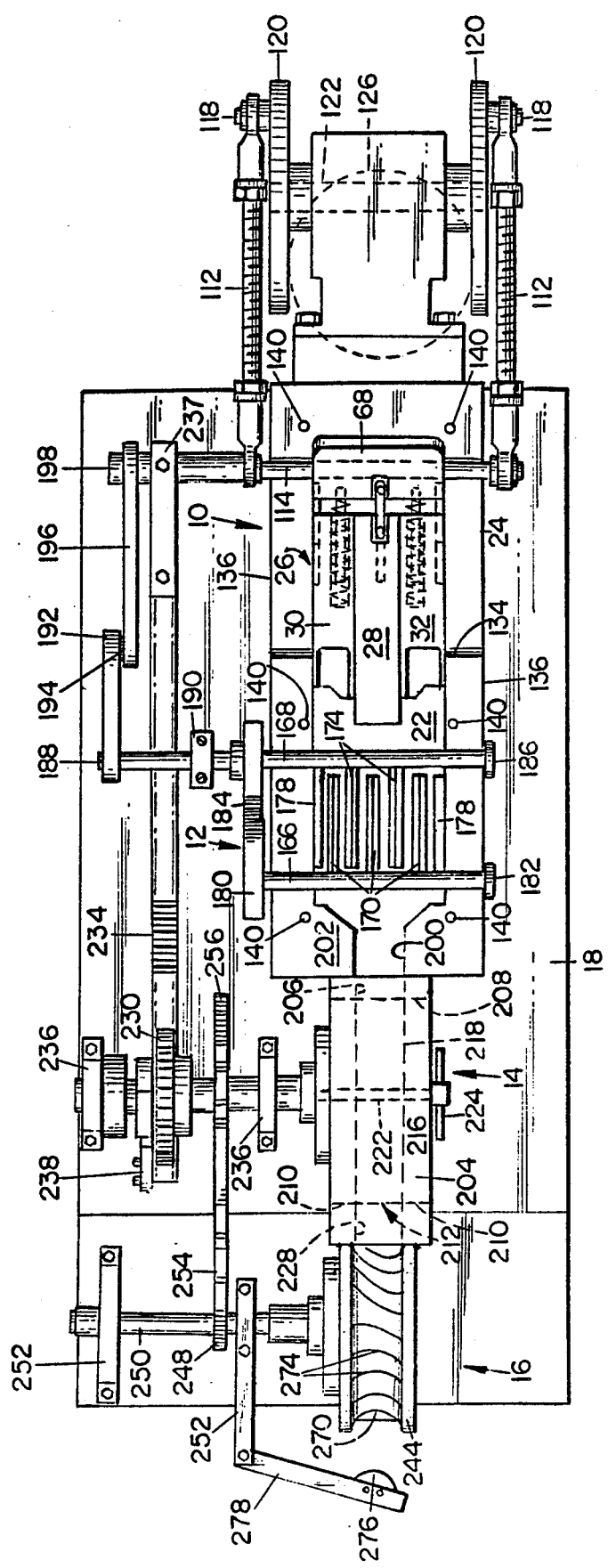
FIG. 3 is a top plan view thereof, with the food hopper removed for clarity.
Figure 4:
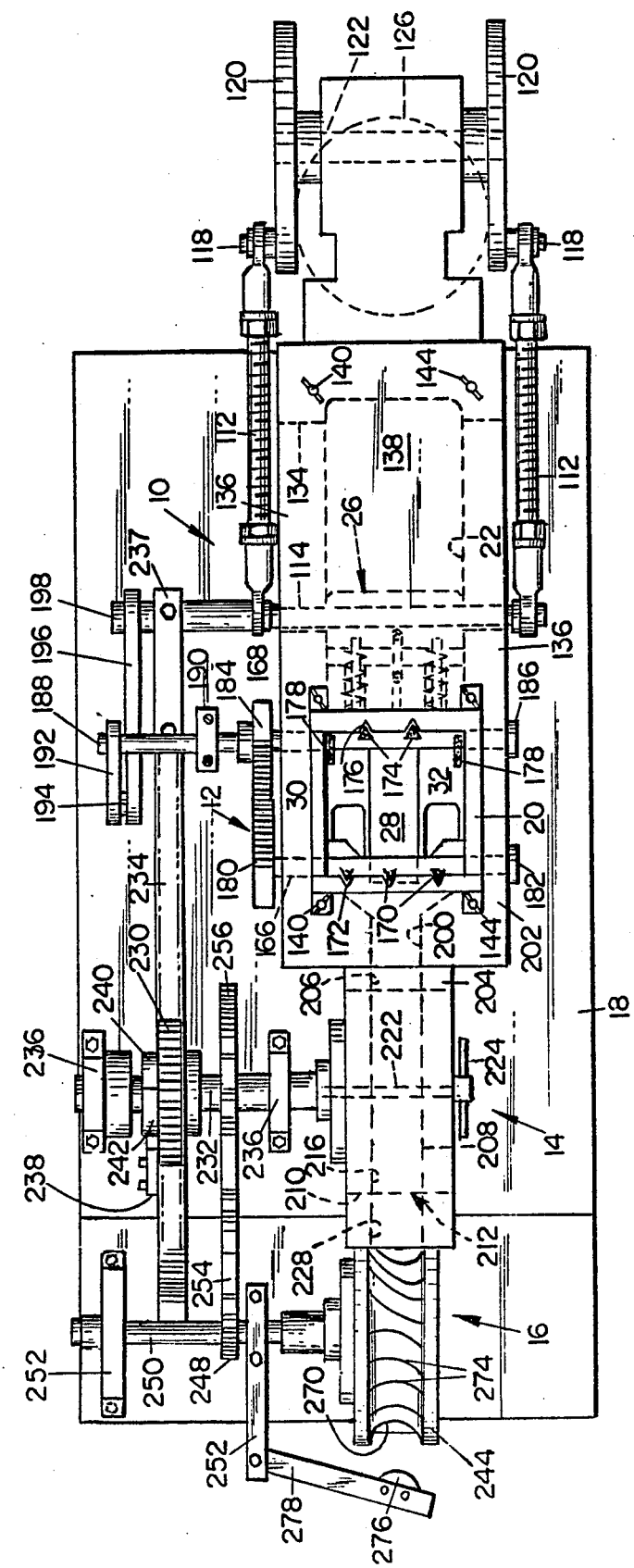
FIG. 4 is a top plan view similar to FIG. 3 showing the apparatus in a compacting position.
Figure 5:
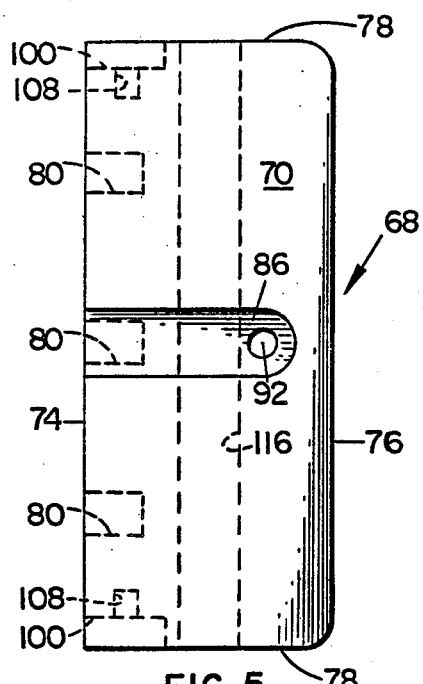
FIG. 5 is a top plan view of the compactor carrier of the compression means.
Figure 6:
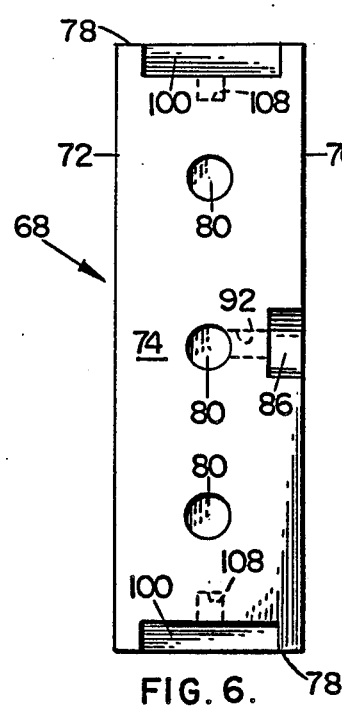
FIG. 6 is an end elevational view thereof as seen from the left of FIG. 5.
Figure 7:
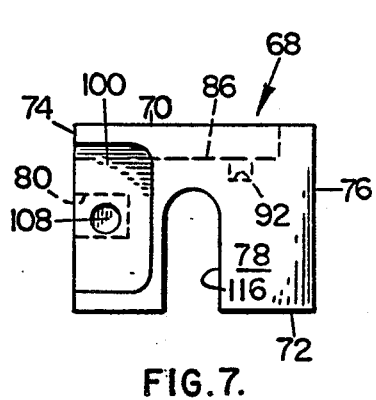
FIG. 7 is a front elevational view thereof.
Figure 8:
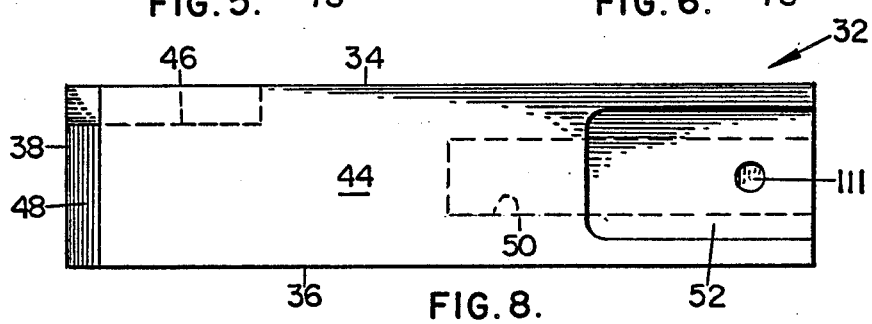
FIG. 8 is a front elevational view of one of the outside pushers or compactors of the compression means.
Figure 9:
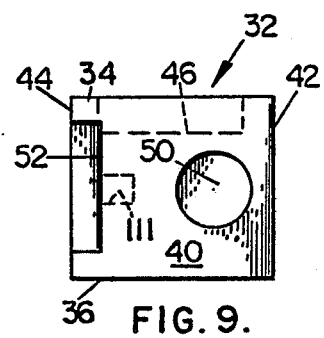
FIG. 9 is an end elevational view thereof as seen from the right of FIG. 8.
Figure 10:
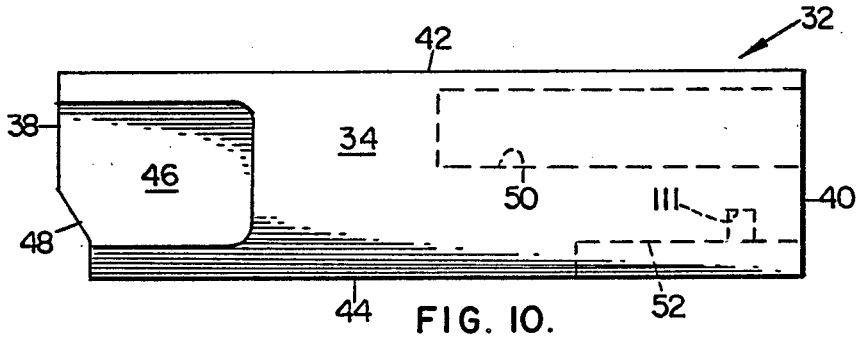
FIG. 10 is a top plan view thereof.
Figure 11:
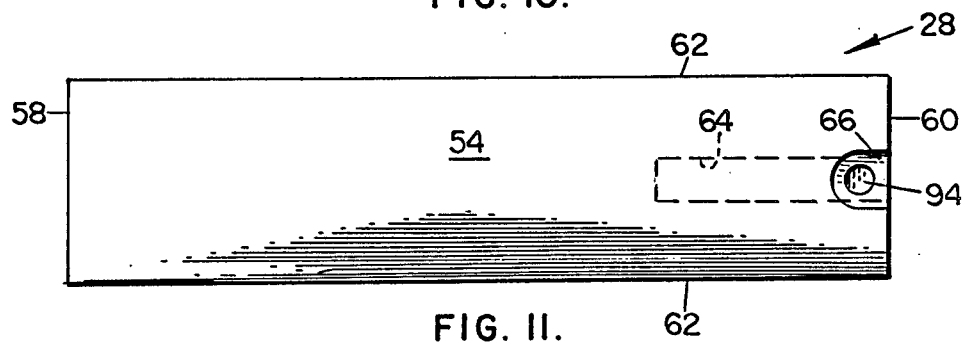
FIG. 11 is a top plan view of the central pusher or compactor of the compression means.
Figures 12, 13:
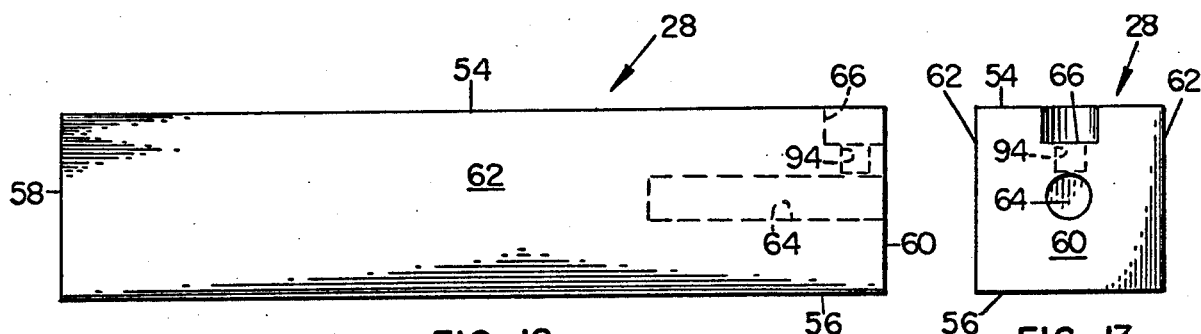
FIG. 12 is a front elevational view thereof.
FIG. 13 is an end elevational view thereof as seen from the right of FIG. 12.
Figure 14:
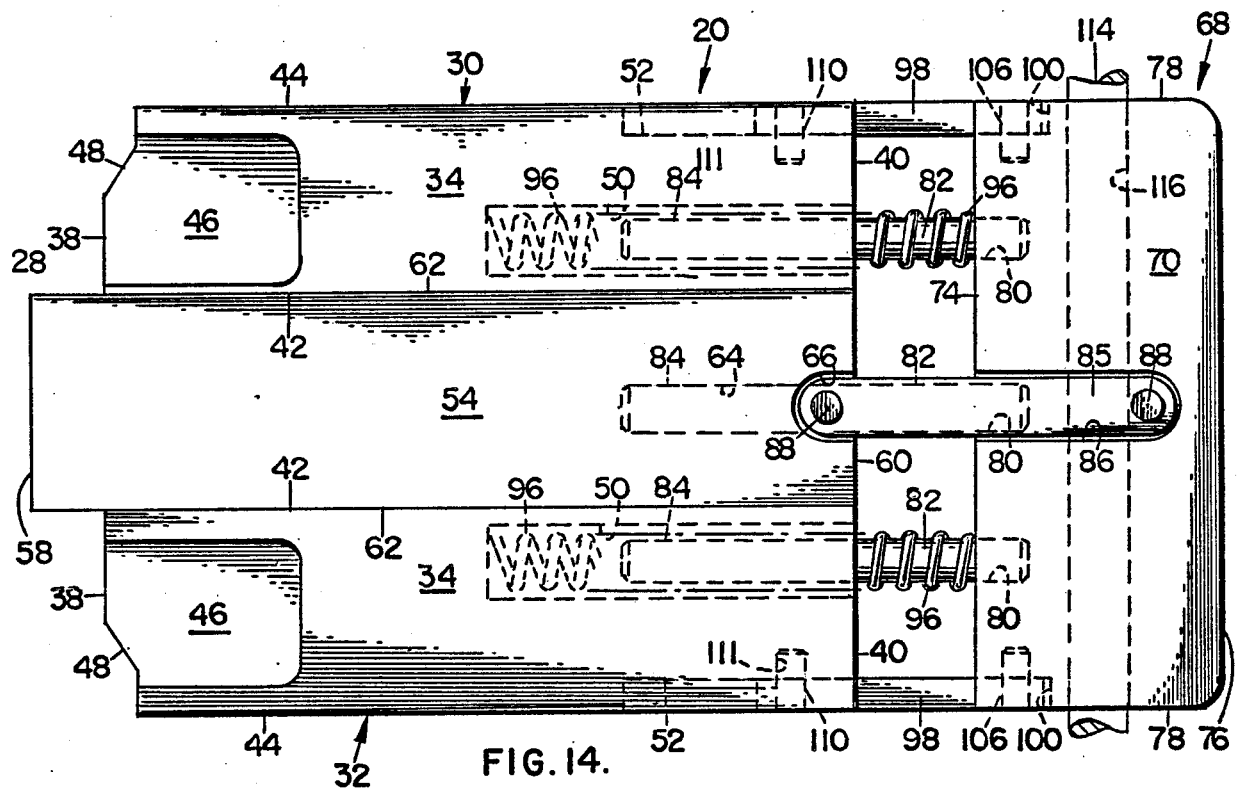
FIG. 14 is a top plan view of the compression means.

Top plate 138 is disposed in spaced parallelism to and immediately above compression means 26. Top plate 138 has been omitted from FIG. 3 for clarity.

A rectangular feed opening 146 extends vertically through top plate 138 and provides for communication between hopper 20 and compression chamber 22.

Hopper 20 is disposed above feed opening 146 of top plate 138 and has spaced, parallel, upright front and rear walls 148 and 150, respectively, interconnected by spaced, parallel, upright side walls 152, each of the walls 148, 150 and 152 bordering the sides of feed opening 146 in top plate 138 and rising vertically upwardly therefrom.

The hopper walls have flanges 154 at their lower ends which extend horizontally forwardly and rearwardly therefrom, the flanges having vertical openings 156 therein for permitting the passage of four of the threaded studs 140 therethrough for releasably securing the hopper to top plate 138 following engagement of wing nuts 142 with the studs.

Spaced, parallel projections 158, (see FIG. 17), depend from the lower surfaces of hopper side walls 152 and have semi-circular cut-outs 160 in the lower ends thereof.

Projections 158 are receivable in a pair of spaced, parallel groove 162 and 164 which extend downwardly into and transversely across the upper surface of top plate 138 at the forward and rearward sides respectively of top plate feed opening 146.

A pair of spaced, parallel shafts 166 and 168 extend transversely across top plate 138 and are receivable in the top plate grooves 162 and 164, with first shaft 166 being receivable in groove 162 and second shaft 168 being receivable in second groove 164.

Each of the shafts 166 and 168 is disposed beneath one of the pairs of hopper projections 158 and rides in the cut-outs 160 of the projections immediately below hopper 20.

A trio of equi-spaced, triangulate or wedge shaped vertically-disposed fingers 170 is fixed at their lower ends to first shaft 166, the upper free ends of the fingers extending into the interior of hopper 20 and being adapted to nest in a trio of spaced, triangulate or wedge shaped, vertically-disposed slots 172 provided on the inner surface of hopper front wall 148.

A pair of similar equi-spaced triangulate or wedge shaped, vertically-disposed fingers 174 is fixed at their lower ends to second shaft 168, the upper free ends of the fingers extending into the interior of hopper 20 and being adapted to nest in a pair of spaced, triangulate or wedge shaped, vertically-disposed slots 176 provided on the inner surface of hopper rear wall 150.

The fingers 170 and 174 are adapted to interdigitate upon rotation of the shafts 166 and 168, for purposes as will appear.

A pair of spaced, flat, vertically-disposed wiper blades 178 is fixed at their lower ends to second shaft 168, the upper free ends of the wiper blades extending into the interior of hopper 20, with a side face of one wiper blade making light contact with the interior of one hopper side wall 152 and a side face of the other wiper blade making light contact with the interior of the other hopper side wall 152, all for purposes as will appear.

A first gear segment 180 is fixed to one end of first shaft 166 outboard of one side wall 136 of compression chamber 22 adjacent a side wall 152 of hopper 20.

A head 182 on the opposite end of first shaft 166 engages the opposite side wall 136 of compression chamber 22 to preclude axial displacement of the shaft.

A second gear segment 184 is fixed to one end of second shaft 168 outboard of one side wall 136 of compression chamber 22 adjacent a side wall 152 of hopper 20 and meshes with first gear segment 180.

A head 86 on the opposite end of second shaft 68 engages the opposite side wall 136 of compression chamber 22 to preclude axial displacement of the shaft. A first shaft extension 188 on second shaft 168 extends horizontally outwardly from second gear segment 184 and passes freely through an upstanding bracket 190 provided on base 18.

A first link 192 is fixed at one end to the outer end of shaft extension 188 and depends therefrom.

First link 192 is pivoted at 194 at its opposite end to one end of a substantially horizontally-disposed second link 196.

Second link 196 is pivoted at its opposite end to the outer free end of a second shaft extension 198 which is fixed to and extends horizontally outwardly from shaft 114 at the connection of the shaft with one of the crank arms 112.

Rotative movement of crank arms 112 sets up linear movement of shaft 114 which in turn sets up rotative movement of links 196 and 192 and shaft extension 188 to effect rotation of second shaft 168 and its attached second gear segment 184 to effect concomitant rotation of first gear segment 180 with which it meshes and first shaft 166 to which gear segment 180 is fixed.

Rotation of shafts 166 and 168 causes swinging movement of fingers 170 and 174 and wiper blades 178 through an arc, with the fingers interdigitating to effectively move food product downwardly from the hopper into compression chamber 22 through feed opening 146, and with the wiper blades cleaning any food product off of the hopper side walls.

The size of gear segments 180 and 184 permits swinging movement of the fingers 170 and 174 through an arc of only 90°, the fingers moving between an upright, vertical position wherein they are disposed in the grooves 172 and 176 of the hopper front and rear walls 148 and 150 respectively and a horizontal position wherein they interdigitate and overlie feed opening 146 immediately below hopper 20, the fingers acting to force food product from the hopper into the feed opening.

Wiper blades 178 swing in an arc of 90° from an upright position wherein they are disposed adjacent hopper rear wall 150 and a horizontal position wherein they overlie feed opening 146 immediately below hopper 20, this movement of the wiper blades effectively wiping food product from the hopper side walls.

Food product fed vertically into compression chamber 22 from hopper 20 is forced horizontally by compression means 26 into and through an annular exit opening 200 in an upright forward wall 202 of slide housing 24 and into portioning area 14, with any excess food product overflowing into the recesses 46 of the outside compactors 30 and 32.

Portioning area 14 includes a generally rectangular portioning housing 204 releasable secured to forward wall 202 of slide housing 24, portioning housing 204 having an annular inlet opening 206 in alignment and communication with slide housing exit opening 200.

Portioning housing 204 is provided with a central circular opening 208 extending transversely therethrough.

A pair of annular portioning wheels or discs 210, secured to each other in face-to-face relationship, cooperantly define a drum 212 which is snugly receivable in housing opening 208.

Figures 20, 21:
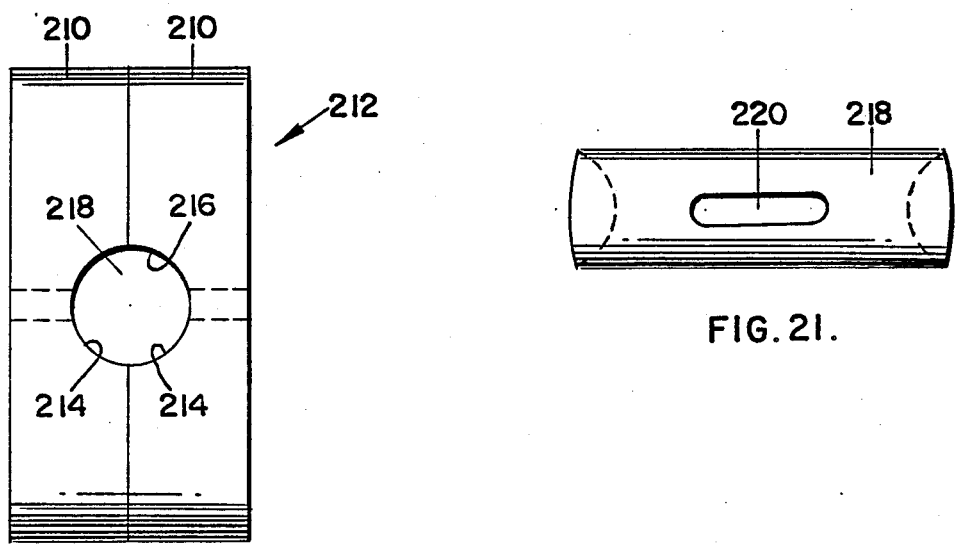
FIG. 20 is an end elevational view of the portioning wheel.
FIG. 21 is a front elevational view of the plug of the postioning wheel.

The discs 210 have aligned central grooves 214 on their inner planar faces, (see FIG. 20), with the two grooves defining a central annular opening 216 which passes through drum 212 and is adapted to communicate with inlet opening 206 in portioning housing 204.

A plug 218 is slidably disposed in opening 216 and has a longitudinally-disposed slot 220 extending transversely therethrough through which a pin 222 is freely extendable into drum 212, the pin having a finger nut 224 threaded thereon.

The slot 220 and plug 218 are of such length that one end face of the plug is always in register with the periphery of the drum, the ends of the plug being appropriately convexly curved to complement the drug contour.

Plug 218 is also of such length as to provide a product chamber 226 defined by the end of the plug and periphery of the drum.

The length of the plug 218 and the size of the drum opening 216 and the limit of the plug stroke determine the size and hence capacity of the product chamber 226. As these dimensions are varied, the amount and weight of food product accommodated by the chamber may be varied accordingly.

Drug 212 is adapted for rotation so that immediately following receipt by one of the product chambers 226 of a charge of the food product, the drum is rotated 180°, whereby the chamber is moved from a 3 o'clock to a 9 o'clock position as viewed in FIG. 1. In this way the next charge of food product forced through inlet opening 206 drives plug 218 relative to opening 216 according to the preset limit of the plug stroke so as forcefully to expel the food product from the first so filled chamber 226 and exteriorly of the product portioning housing 204 through an exit opening 228 to shaping area 16.

Because plug 218 is slidably nested within opening 216 of drum 212, and because the drum is adapted for 180 degree rotation, the product chambers are each rotated intermittently and alternately between the 3 o'clock receiving position (wherein a charge of food product is received therein) and the 9 o'clock dispensing position (wherein the food product is discharged therefrom).

Rotation of drum 212 is effected by a gear 230 mounted on a shaft 232 which is fixed to and extends horizontaly outwardly from a side face of the drum, gear 230 meshing with a horizontally-disposed rack 234 slidable relative to a track 235 provided on base 18.

Horizontal reciprocating movement of rack 234 relative to track 235 is effected by crank arms 112, shaft 114 and shaft extension 198, which extends through a drive plate 237 which is fixed to one end of the rack and extends upwardly therefrom.

Shaft 232 is rotatably supported by spaced, upright brackets 236 also provided on base 18.

A unidirectional clutch, not shown, disposed on shaft 232 limits drum rotation to only one direction of rotation.

A stop 238 fixed to rack 234 is engageable, on the retrograde stroke of the rack, in cut-outs 240 provided in the periphery of a stop 242 fixed to shaft 232, whereby chambers 226 of the drum are moved into exact alignment with inlet openings 206 of housing 204.

Linear movements of the compactors of the compression means 26 are, of course, timed with the rotative movement of the drum.

By this arrangement, the pockets of the drum communicate in seriatim in food-receiving position with the chamber for receiving and portioning a predetermined charge of the food product expressed from the chamber responsively to the forward drive of the compactors.

The crank arrangement allows the compressing stroke of the compactors for compressing the food product into the pocket and maintaining a tension on the food product, first as same is charged into the receiving pocket, and second, during a momentary dwell time as the drum commences rotation out of registry with the charging chamber and the compactors commence the relieving stroke for opening the charging chamber for the recharging thereof.

Additionally, the drum may be provided with pockets of varying configurations by means of such as slugs or the like which may be inserted thereinto whereby shapes, such as spherical shapes, may be imparted to the charges.

The portioned food product exits from exit opening 228 of housing 204 to a shaping wheel 224 disposed in shaping and dispensing area 16 and mounted for rotation relative to a shoe 246 fixed to the forward end of portioning housing 204.

Rotation of shaping wheel 244 is effected by a sprocket 248 mounted on a shaft 250 fixed to and extending horizontally outwardly from the shaping wheel and supported upwardly of base 18 by spaced, upright brackets 252.

Sprocket 248 is driven by a chain 254 entrained therearound and around a sprocket 256 fixed to shaft 232 in portioning area 14, wherefore rotation of the shaping wheel in shaping area 16 is timed to rotation of portioning drum 212 in the portioning area.

Shoe 246 is substantially L-shaped in side elevation and includes an upright rear wall 258 and an integral lower wall 260 which extends horizontally outwardly and forwardly therefrom, with the inner faces of the walls 258 and 260 being curved as at 262 to conform to the contour of shaping wheel 244 and being provided with a centrally-located semi-circular recess 264 which extends inwardly into each wall.

Figure 2:
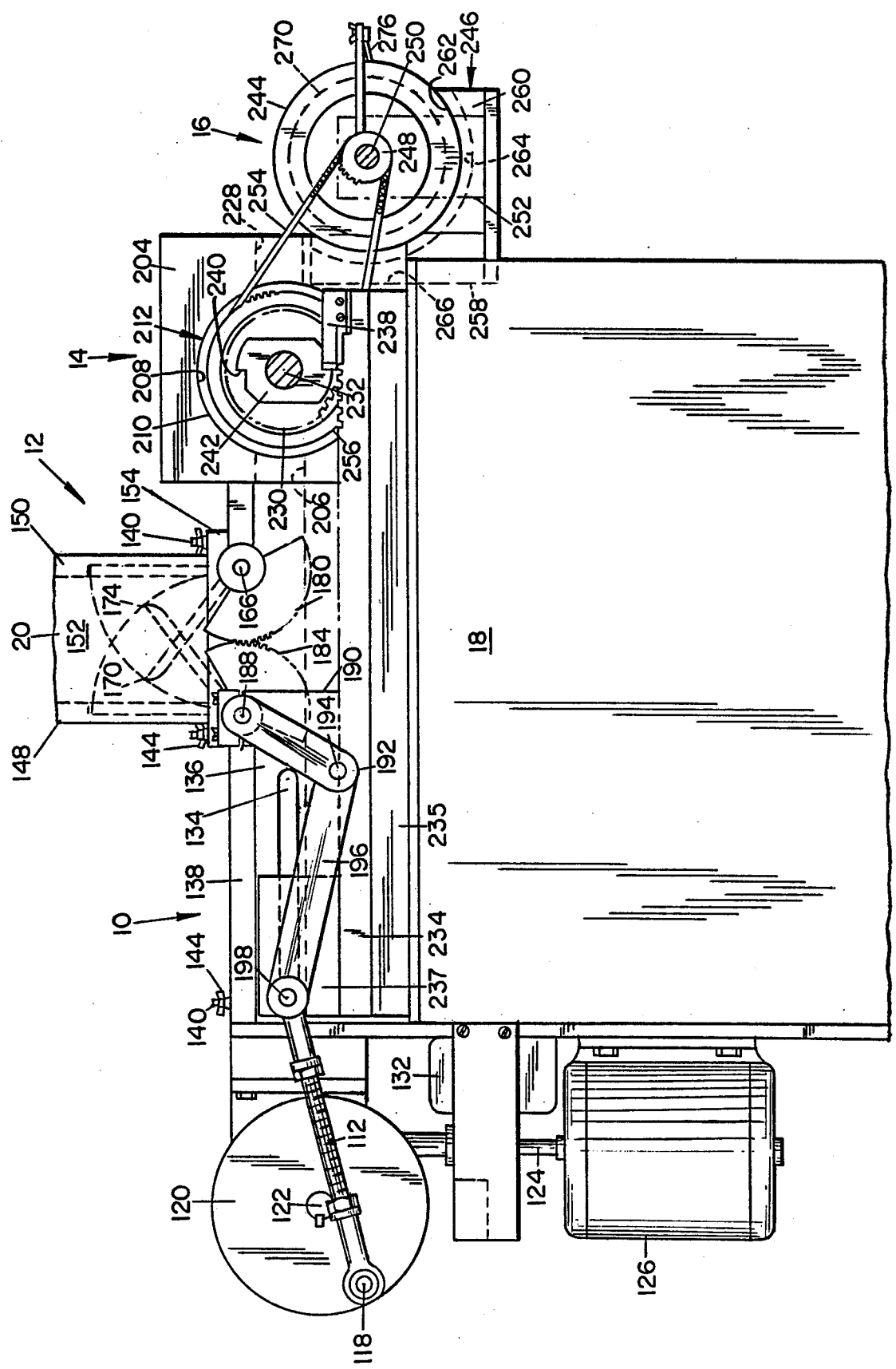
FIG. 2 is a rear elevational view thereof.

The upper portion of shoe rear wall 258 is nested in a cut-out 266, best seen in FIGS. 1, 2 and 16, provided in the forward wall of positioning housing 204 immediately below housing exit opening 228, with cut-out 266 communicating with drum opening 208 of housing 204.

A cut-off knife 268 fixed to the rear face of shoe rear wall 258 is positioned in cut-out 266 and extends transversely across shoe recess 264, the blade portion of the cut-off knife engaging the periphery of portioning wheels 210, for purposes to appear.

Shaping wheel 244 is of such size that a portion of its periphery rides in the curved portion 262 of shoe 246.

The periphery of shaping wheel 244 is provided with an inwardly extending semi-circular recess 270 which complements the semi-circular recess 264 of shoe 246 wherefore the two recesses together provide a circular opening 272.

Shaping wheel recess 270 is provided with spaced striations 274 for purposes to appear.

The food product expelled from portioning area 14 into shaping area 16 is cut to a rod shaped configuration by cut-off knife 268 and is shaped into a spherical configuration in the opening 272 formed by shaping wheel 244 and shoe 246 as the shaping wheel is rotated relative to the shoe, with movement of the so-shaped food product being assisted by striations 274 in shaping wheel 244, the food product being expelled from the shoe into any suitable container or a conveyor, not shown.

A wiper 276 is provided for manual movement into the recess 270 of shaping wheel 244 for periodically cleaning the recess as required, the wiper being fixed to one end of an arm 278 pivoted at its opposite end to an extension on one of the brackets 252.

I claim:

1. Apparatus for portioning, shaping and dispensing a plurality of molded, spherically shaped meatballs comprising:

a food product entry area including a food product supply hopper and an interconnecting compression chamber for the containment and pressurizing of the food product, sets of spaced interdigitating food product engaging fingers swingably mounted in the supply hopper for moving the food product into the compression chamber, a pair of spaced wiper blades swingably mounted in the supply hopper for wiping food product from the hopper walls, compression means within the compression chamber comprising a trio of side-by-side compactors and a compactor carrier, the compactors including a central compactor flanked by outside compactors all linked to the compactor carrier, the central compactor being rigidly linked to the compactor carrier and the outside compactors being spring-loaded and mounted for reciprocatory movement relative to the compactor carrier, the compression means pressurizing the food product within the compression chamber preparatory to and during the movement of the food product into a positioning area, the portioning area including a drum rotatable confined within a housing and having a diametrically-disposed opening therethrough defining a pair of aligned radially-arranged pockets of alternately increasing and decreasing size according to the movement of a plug limitedly-reciprocable within the opening in the area intermediate the two pockets, the pockets of the drum each communicating through the houslng in seriatim first as a receiving pocket with the compression chamber for shaping, and measuring a charge of the food product loaded thereinto from the compression chamber responsively to the motivation of the compactors and second as a dispensing pocket with atmosphere for dispensing the shaped and portioned charge from the area into the shaping and dispensing area, with the compressing stroke of the compactor maintaining a tension on the food product during loading into the receiving pocket and therefollowing during a momentary dwell period as rotation of the drum out of register with the compression chamber is initiated folowing which the compactors are retracted in relieving stroke as the food product charged pocket is completely encapsulated by the cooperant drum and plug and housing is rotated into dispensing position as effected by the loading of the second-to-be-filled pocket and the resultant limited sliding movement of the plug within the drum opening, the portioned food product exiting from the portioning area to the shaping and dispensing area, the shaping and dispensing area comprising a grooved shaping wheel mounted for rotation relative to a grooved fixed shoe, the food product being deposited in the groove between the shaping wheel and fixed shoe for imparting a spherical shape thereto, with the resultant shaped article being dispensed into a suitable receiving means.

2. Apparatus according to claim 1 wherein portions of the outside compactors are relieved and cut away for providing relief areas for accepting excess food product compressed within the compression chamber.

* * * * *